(12) United States Patent
Codere et al.

(10) Patent No.: US 7,543,672 B2
(45) Date of Patent: Jun. 9, 2009

(54) STRADDLE-TYPE WHEELED VEHICLE AND FRAME THEREOF

(75) Inventors: Bruce Codere, Canton de Granby (CA); Brian Mastine, Richmond (CA)

(73) Assignee: Bombardier Recreational Products Inc., Valcourt (CA)

( * ) Notice: Subject to any disclaimer, the term of this patent is extended or adjusted under 35 U.S.C. 154(b) by 522 days.

(21) Appl. No.: 11/381,036

(22) Filed: May 1, 2006

(65) Prior Publication Data

US 2007/0251745 A1 Nov. 1, 2007

(51) Int. Cl.
*B62D 61/06* (2006.01)
(52) U.S. Cl. .................. 180/210; 180/312; 180/908; 280/781
(58) Field of Classification Search .................. 180/311, 180/312, 210, 217, 908; 280/781, 786, 787
See application file for complete search history.

(56) References Cited

U.S. PATENT DOCUMENTS

| 3,521,904 | A |   | 7/1970 | Sheffer |  |
|---|---|---|---|---|---|
| 3,698,502 | A |   | 10/1972 | Patin |  |
| 4,623,167 | A | * | 11/1986 | Matsubayashi et al. | 280/798 |
| 4,735,275 | A | * | 4/1988 | Tsukahara et al. | 180/215 |
| 4,770,262 | A |   | 9/1988 | Yasunaga et al. |  |
| 4,924,961 | A |   | 5/1990 | Bernardi |  |
| 5,480,001 | A |   | 1/1996 | Hara |  |
| 5,845,728 | A |   | 12/1998 | Itoh et al. |  |
| 5,845,918 | A |   | 12/1998 | Grinde et al. |  |
| 5,975,624 | A |   | 11/1999 | Rasidescu et al. |  |
| 6,142,498 | A |   | 11/2000 | Smith |  |
| 6,170,841 | B1 |   | 1/2001 | Mizuta |  |
| 6,305,700 | B1 |   | 1/2001 | Bruehl |  |
| 6,572,129 | B1 | * | 6/2003 | Bean | 280/234 |
| 6,799,781 | B2 | * | 10/2004 | Rasidescu et al. | 280/781 |
| 6,948,581 | B2 |   | 9/2005 | Fecteau et al. |  |
| 7,021,664 | B2 |   | 4/2006 | Mercier et al. |  |
| 2004/0050605 | A1 | * | 3/2004 | Fecteau et al. | 180/210 |
| 2006/0006623 | A1 |   | 1/2006 | Leclair |  |

FOREIGN PATENT DOCUMENTS

EP 0826584 B1 4/1998
WO 03070548 A 8/2003

OTHER PUBLICATIONS

International Search Report, PCT/US2006/016352; Mailed Jan. 31, 2007; Feber, Laurent.
Reinmech Sales Brochure Located, May 25, 2000.
Suzuki LT-F160 Parts Catalog, May 1997.

* cited by examiner

*Primary Examiner*—Ruth Ilan
(74) *Attorney, Agent, or Firm*—Osler, Hoskin & Harcourt LLP

(57) ABSTRACT

A straddle-type three-wheeled vehicle has a frame having an upper frame member, a lower frame member, a forward cross member interconnecting a forward portion of the upper frame member with a forward portion of the lower frame member, and a rearward cross member interconnecting a rearward portion of the upper frame member with a rearward portion of the lower frame member. A strut extends diagonally from the forward cross member to the lower frame member. The vehicle has an engine mounted to the frame. An air box of the vehicle has at least a portion thereof disposed above at least a portion of the engine. A fuel tank of the vehicle is disposed rearwardly of the air box.

25 Claims, 16 Drawing Sheets

STRADDLE-TYPE WHEELED VEHICLE AND FRAME THEREOF

FIELD OF THE INVENTION

The present invention relates to a straddle-type wheeled vehicle frame and to the arrangement of the vehicle components on the frame.

BACKGROUND OF THE INVENTION

To date, few three-wheeled straddle-type vehicles have been produced commercially for road use. One possible configuration of such a vehicle consists in having two wheels at the front of the vehicle and one at the rear of the vehicle. The vehicle has to be provided with a frame to mount the wheels and the various components of the vehicle, such as the engine, air box and fuel tank.

One previous type of vehicle frame, known as a space frame or a ladder frame, has been used in all-terrain vehicles (ATVs) having four wheels. FIG. 1 illustrates such a frame 850. The frame 850 includes a spaced pair of upper tubular members 852, 854 and a spaced pair of lower tubular members 856, 858. The upper and lower members 852-858 are interconnected by respective spaced pairs of cross members 860, 862 and 864, 865. Respective pairs of the upper and lower members 852, 854 and 856, 858 are connected by laterally extending cross members 866 (connecting the upper members 852, 854) and cross members 868 (connecting the lower members 856, 858). A plate 870 is connected between the lower members 856, 858 to thereby add additional rigidity between the lower members 856, 858.

As can be seen in the example described above in FIG. 1, these frames have been either complex or have used a large amount of material, or both. It is possible to construct the frame with high strength metal alloys to increase strength properties of the frame without relatively increasing the weight. However, these metal alloys are costly and some require additional processing steps (such as post-weld heat treatment) in the manufacture of the frame.

Another type of vehicle frame is disclosed in U.S. Pat. No. 6,799,781, assigned to Bombardier Recreational Products Inc. The frames described therein are less complex and costly than the above-mentioned space frames. This is achieved by using a plurality of central beams to make up the frame. However, these frames were developed for ATVs which are generally operated off-road at reduced speeds. Road vehicles must operate at much higher speeds (100 km/h or more) and their frames are thereof subjected to greater forces. The frames described in the '781 patent may not be able to resists these high forces. They could be modified to increase the size of the central beams or by using stronger materials but this would result in increased costs and most likely in an increase in weight as well.

As shown in the '781 patent, the frames described therein were designed for four-wheeled ATVs which typically use a McPherson suspension for the front wheels. This type of suspension can easily be accommodated by the described frames. However, straddle-type three-wheeled vehicles are intrinsically less stable than four-wheeled vehicles (but it should be noted that the lower stability of a three-wheeled vehicle versus a four-wheeled vehicle should not be understood to mean that a three-wheeled vehicle is unstable to the point that it is dangerous to a user). For this reason, it is preferable that the front wheels of a three-wheeled vehicle should use a type of suspension that helps controlling the roll or sway of the vehicle more than a McPherson suspension.

All of the above-mentioned frames were developed for ATVs and as such do not satisfactorily respond to the previously enumerated needs of straddle-type three-wheeled vehicles for road use.

Therefore, there is a need for a frame which addresses some of the needs of a straddle-type three-wheeled vehicle having two front wheels.

There is also a need to provide a straddle-type three-wheeled vehicle for road use which has a relatively simple frame while providing the strength requirement for such an application.

There is also a need to provide a straddle-type three-wheeled vehicle for road use with a frame which can accommodate a front suspension that helps controlling the roll or sway of the vehicle.

Also, three-wheeled vehicles having two front wheels and one rear wheel do not have as much room to accommodate components in the rear portion thereof as four-wheeled vehicles, such as ATVs, due to their reduced width at the back. Therefore, the vehicle components, such as the engine, air box, and fuel tank, cannot be arranged in the same manner. Thus, there is also a need for an arrangement of the vehicle components which is suitable for the space limitations of a straddle-type three-wheeled vehicle having two front wheels while maintaining accessibility to the components which require it.

STATEMENT OF THE INVENTION

One aspect of the invention provides a frame suitable for use with a straddle-type three-wheeled vehicle having two front wheels.

Another aspect of the invention provides a straddle-type three-wheeled vehicle for road use having a frame which is suitable for this type of application.

In another aspect, the invention provides a straddle-type three-wheeled vehicle for road use having double A-arm front suspensions for the front wheels and a frame adapted to receive this type of suspension.

Yet another aspect of the invention provides a three-wheeled vehicle having an arrangement of the vehicle components, such as the engine, air box, and fuel tank, on a frame of the vehicle.

In another aspect, the invention provides a wheeled vehicle having a frame. The frame has an upper frame member, a lower frame member, a forward cross member interconnecting a forward portion of the upper frame member with a forward portion of the lower frame member, and a rearward cross member interconnecting a rearward portion of the upper frame member with a rearward portion of the lower frame member. The upper frame member, lower frame member, forward cross member, and rearward cross member define a closed perimeter with a space therein. A strut extends from one of the upper frame member, the lower frame member, the forward cross member, and the rearward cross member, to another one of the upper frame member, the lower frame member, the forward cross member, and the rearward cross member. The upper frame member, lower frame member, forward cross member, rearward cross member, and strut are disposed along a longitudinal centerline of the vehicle. The vehicle also has a straddle seat mounted on the upper frame member, a front left wheel, and a front right wheel. Each of the front wheels is mounted to the frame via a front suspension. A single rear wheel is disposed along the longitudinal centerline of the vehicle. A swing arm mounts the single rear wheel to the frame. A rear suspension is operatively disposed between the swing arm and the frame. A steering column is operatively connected to the front wheels to steer the front wheels. The steering column extends inside the space rearwardly of the forward cross member. Handlebars are connected to an upper end of the steering column above the upper frame member. An engine is disposed in the space and is operatively connected to the rear wheel to power the rear wheel.

In an additional aspect, the strut extends diagonally from the forward cross member to the lower frame member.

For purposes of this application, the terms "extends diagonally" refer to the orientation of a straight line which connects a first end of an element with the other end of the element. They do not require that the whole element which "extends diagonally" lie on such a line, although it is contemplated that it may do so.

In a further aspect, each of the front suspensions is connected to the frame at a plurality of positions, one of the plurality of positions being on the strut.

In an additional aspect, each of the front suspensions comprises an upper A-arm and a lower A-arm. Each A-arm has a front arm and a rear arm. The rear arm of each upper A-arm is connected to the strut.

In a further aspect, the steering column passes through the upper frame member forwardly of the straddle seat.

In an additional aspect, the steering column passes through the strut.

In yet another aspect, the invention provides a frame for a wheeled vehicle. The frame has an upper frame member, a lower frame member, a forward cross member interconnecting a forward portion of the upper frame member with a forward portion of the lower frame member, and a rearward cross member interconnecting a rearward portion of the upper frame member with a rearward portion of the lower frame member. The upper frame member, lower frame member, forward cross member, and rearward cross member define a closed perimeter with a space therein. A strut extends from one of the upper frame member, the lower frame member, the forward cross member, and the rearward cross member, to another one of the upper frame member, the lower frame member, the forward cross member, and the rearward cross member. A plurality of suspension attachment points are disposed on the frame. The upper frame member, lower frame member, forward cross member, rearward cross member, and strut are disposed along a common plane.

In an additional aspect, the strut extends diagonally from the forward cross member to the lower frame member.

In a further aspect, the rearward cross member extends rearwardly and upwardly from the lower frame member.

In an additional aspect, the lower frame member and the rearward cross member are integrally formed.

For purposes of this application, the terms "integrally formed" mean that one element is formed as a unit with another element.

In yet another aspect, the invention provides a wheeled vehicle having a frame. The frame has an upper frame member, a lower frame member, a forward cross member interconnecting a forward portion of the upper frame member with a forward portion of the lower frame member, and a rearward cross member interconnecting a rearward portion of the upper frame member with a rearward portion of the lower frame member. The upper frame member, lower frame member, forward cross member, and rearward cross member are disposed along a longitudinal centerline of the vehicle and define a closed perimeter with a space therein. The vehicle also has a straddle seat mounted on the upper frame member, a front left wheel, and a front right wheel. Each of the front wheels is mounted to the frame via a front suspension. A single rear wheel is disposed along the longitudinal centerline of the vehicle. A swing arm mounts the single rear wheel to the frame. A rear suspension is operatively disposed between the swing arm and the frame. A steering column is operatively connected to the front wheels to steer the front wheels. The steering column extends inside the space rearwardly of the forward cross member. Handlebars are connected to an upper end of the steering column above the upper frame member. An engine is mounted in the space to the frame and is operatively connected to the rear wheel to power the rear wheel. An air box is disposed in the space and has at least a portion thereof disposed above at least a portion of the engine and below the upper frame member. A fuel tank mounted in the space to below the upper frame member and rearwardly of the air box.

In an additional aspect, a strut extends diagonally from the forward cross member to the lower frame member and a portion of the engine is mounted to the strut.

In a further aspect, the engine is a V-type engine. The engine has a crankshaft disposed horizontally and perpendicularly to the longitudinal centerline of the vehicle, a front cylinder defining a front cylinder axis, and a rear cylinder defining a rear cylinder axis. The air box is disposed longitudinally forwardly of the rear cylinder axis.

In an additional aspect, the fuel tank has a fuel tank filler cap disposed below the straddle seat. The straddle seat is mounted on the upper frame member such that the straddle seat is capable of being moved to a position providing access to the fuel tank filler cap.

For purposes of this application, terms used to locate elements on the vehicle, such as "front", "back", "rear", "left", "right", "up", "down", "above", and "below", are as they would normally be understood by a rider of the vehicle sitting on the vehicle in a forwardly facing, driving position. The term "longitudinal" means extending from the front to the back.

Embodiments of the present invention each have at least one of the above-mentioned aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE INVENTION

Figure 1:
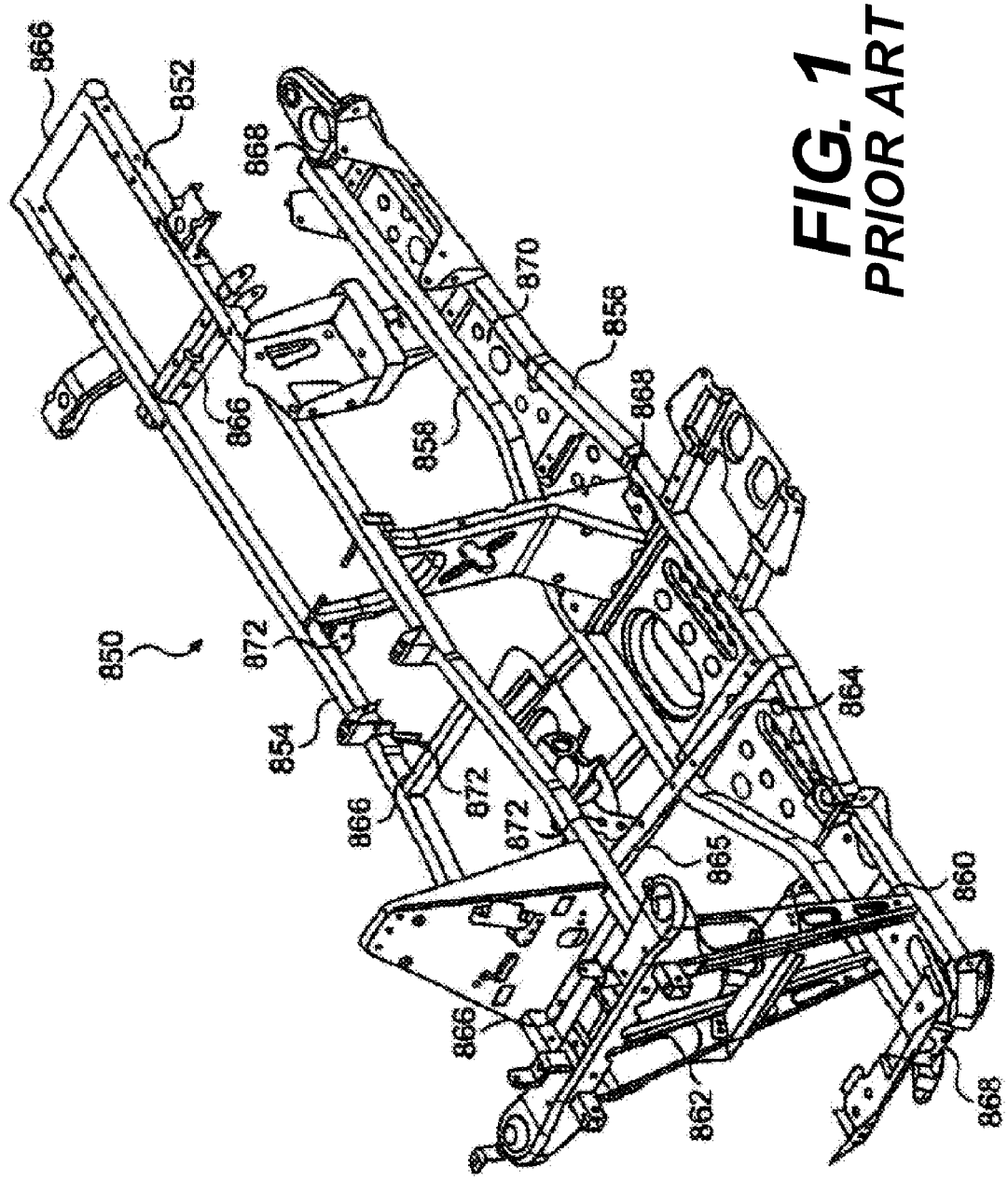
FIG. 1 is a perspective view of a prior art frame typically used in an ATV.
Figure 2:
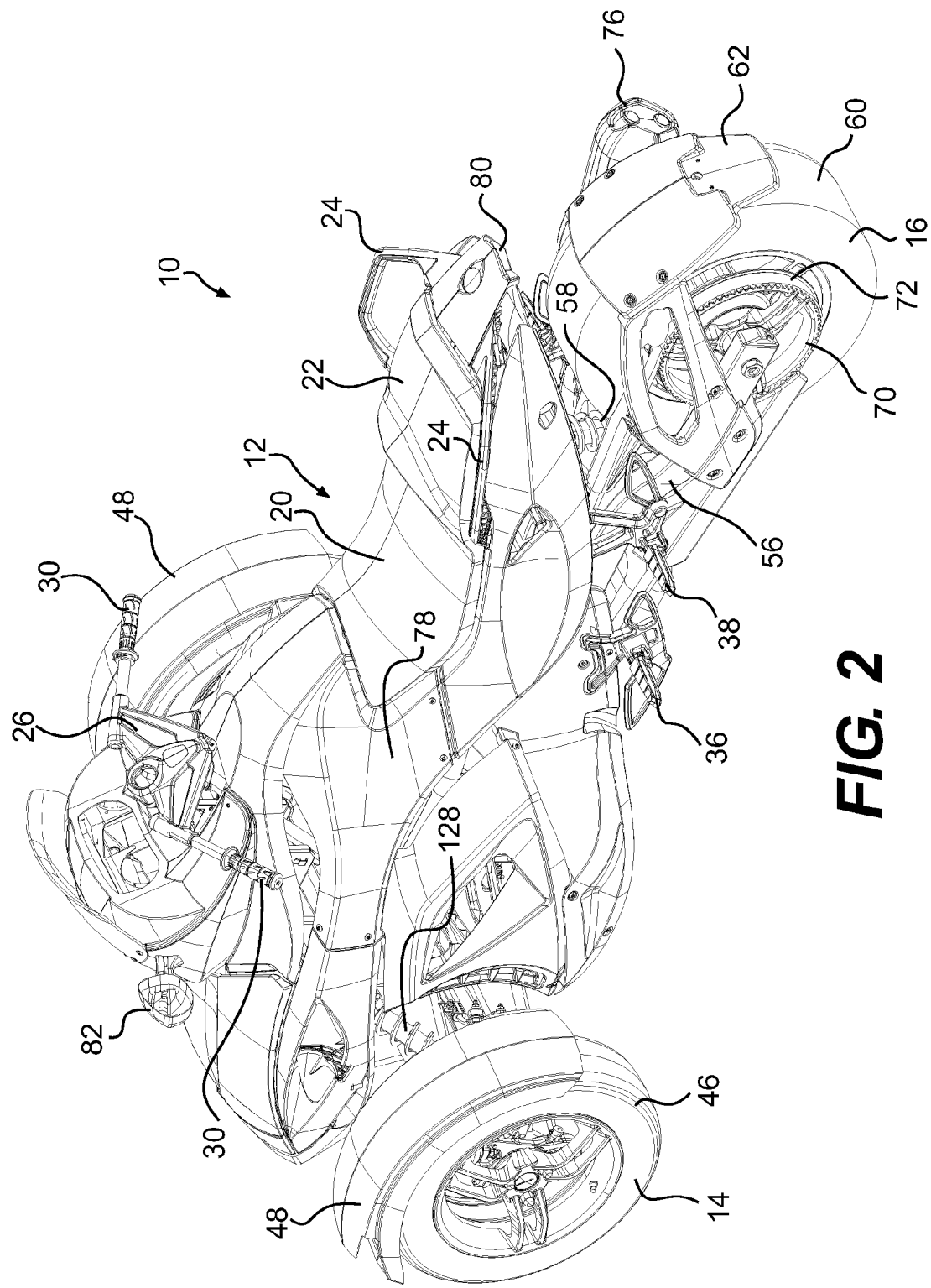
FIG. 2 is a perspective view, taken from a rear, left side, of a vehicle in accordance with the present invention.
Figure 3:
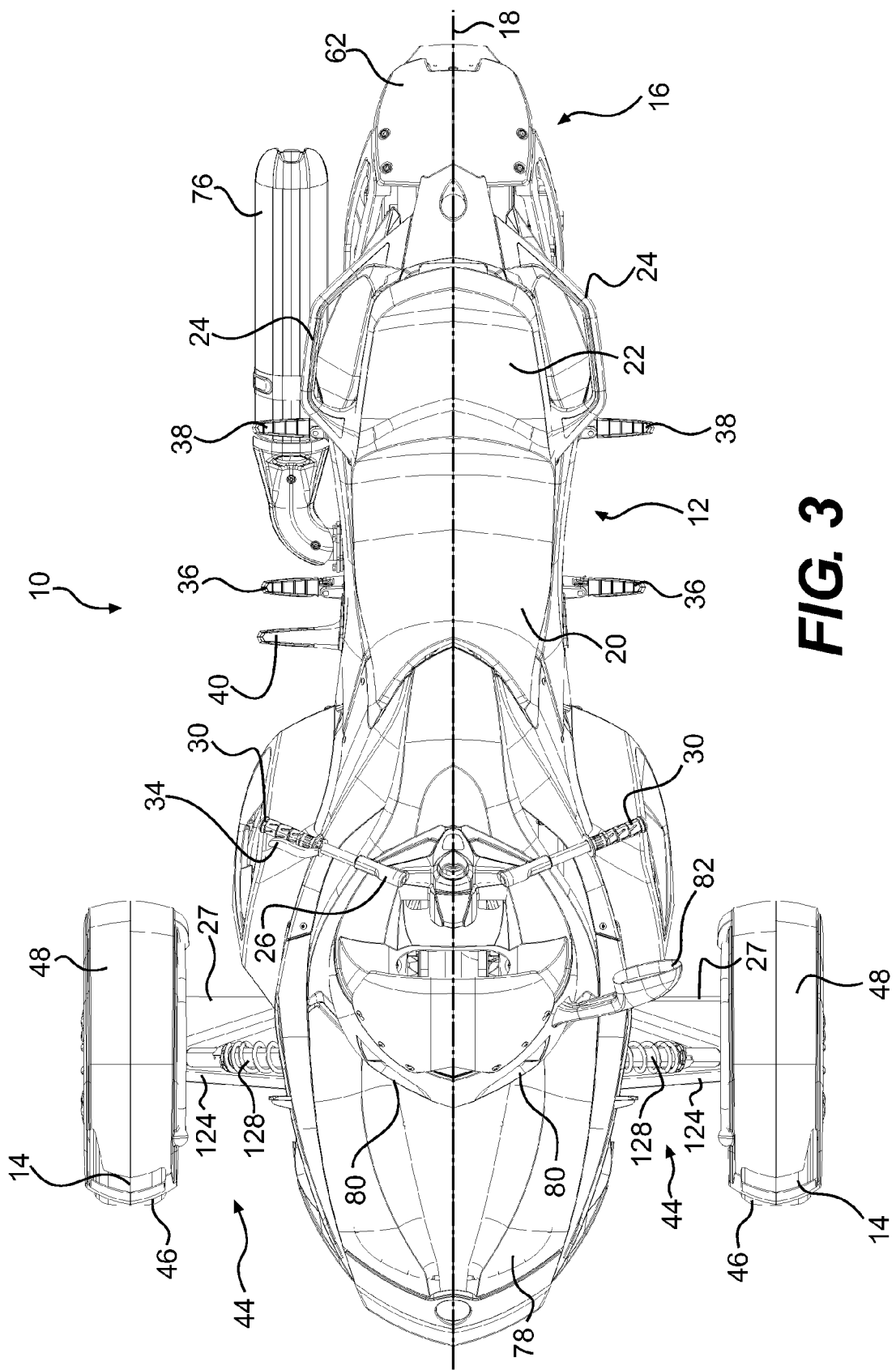
FIG. 3 is a top view of the vehicle of FIG. 2.
Figure 4:
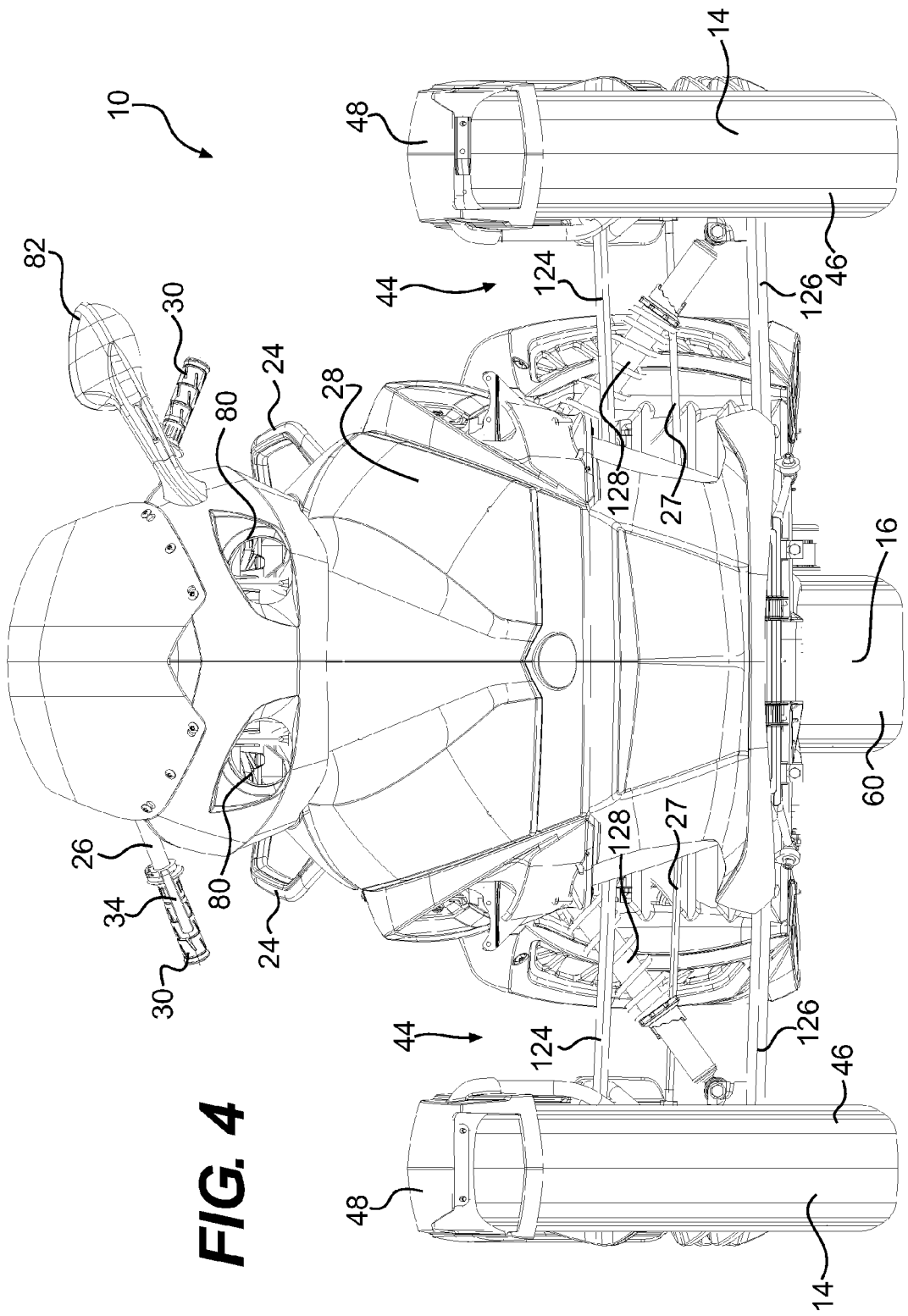
FIG. 4 is front view of the vehicle of FIG. 2.
Figure 5:
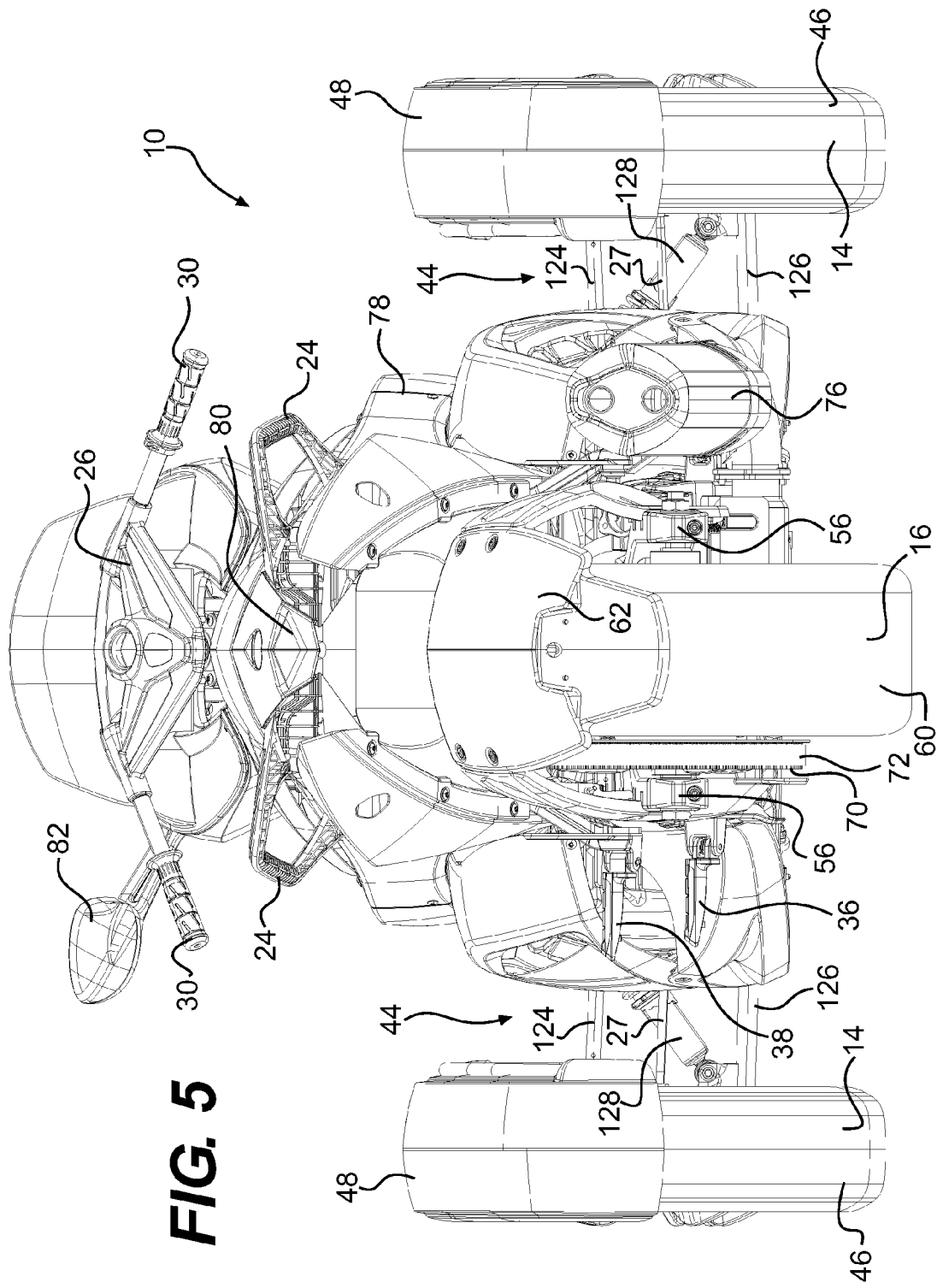
FIG. 5 is a back view of the vehicle of FIG. 2.

As seen in FIGS. 2 to 7, the vehicle 10 has a straddle seat 12 located at least partially rearwardly of a center of the vehicle 10 and disposed along the longitudinal centerline 18 (FIG. 2) thereof. The straddle seat 12 has a first portion 20 for accommodating a driver, and a second portion 22 for accommodating a passenger behind the driver. The second portion 22 is higher than the first portion 20 to permit the passenger to see in front of the vehicle 10 over the driver. A pair of handles 24 are provided on either side of the second portion 22 for the passenger to hold onto. It is contemplated that the straddle seat 12 could be disposed at a different longitudinal location depending on the particular ergonomics of the vehicle 10. It is also contemplated that the straddle seat 12 could only have the first portion 20 for the driver.

Figure 8:
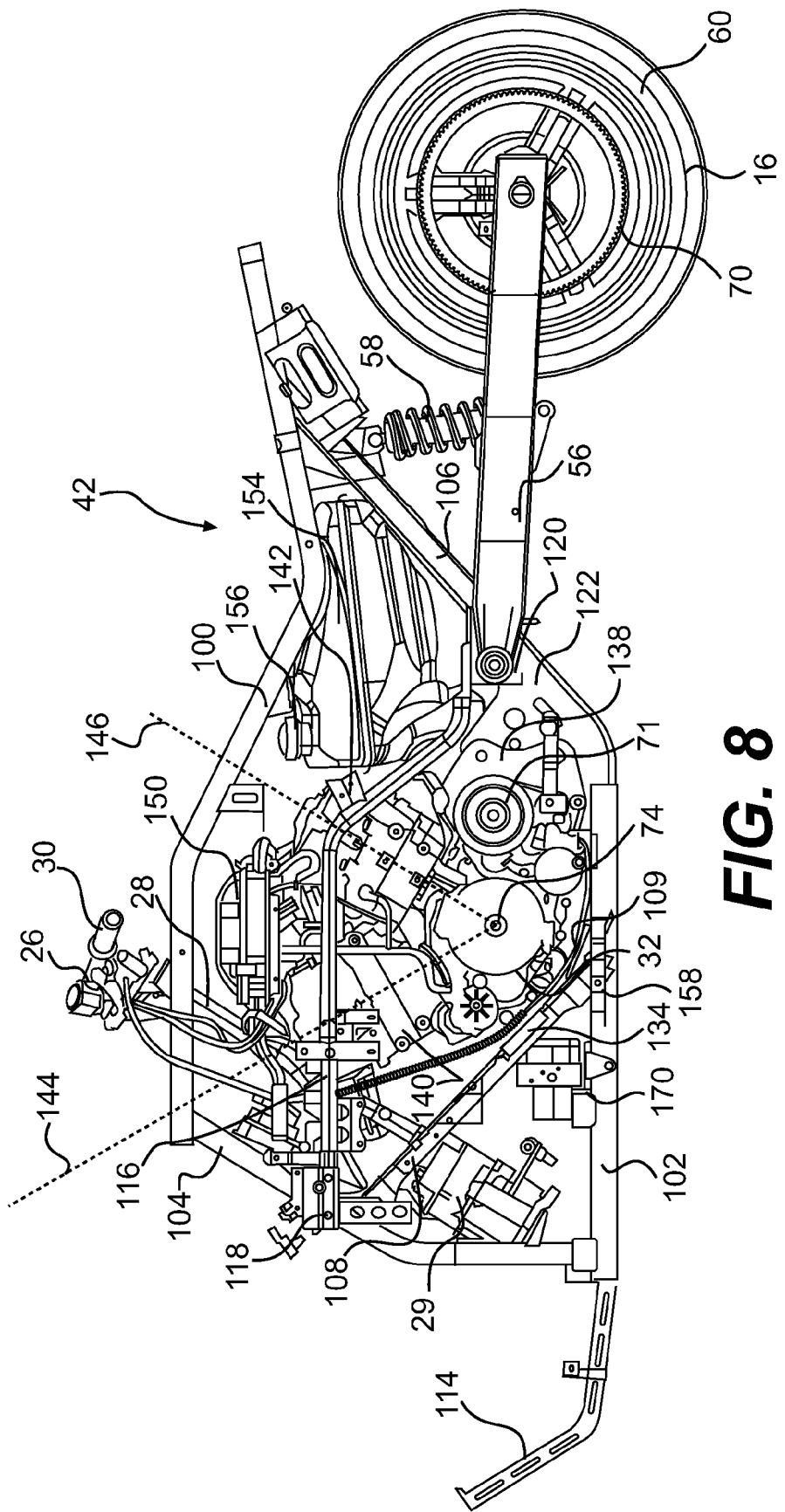
FIG. 8 is a left side elevation view of the internal components of the vehicle of FIG. 2 with some of the components removed for clarity.

A steering assembly is disposed forwardly of the straddle seat 12 to allow a driver to steer the two front wheels 14. The steering assembly has handlebars 26 connected to a steering column 28 (FIG. 8). The steering column 28 is connected to the two front wheels 14 via tie rods 27, such that turning the handlebars 26 turns the steering column 28 which, through the tie rods 27, turns the wheels 14. The steering assembly can optionally be provided with a power steering unit 29 (FIG. 8) which facilitates steering of the vehicle 10. The handlebars 26 are provided with handles 30 for the driver to hold. The right handle 30 can twist and acts as the throttle controller for the engine 32 (FIG. 8). It is contemplated, that the throttle could also be controlled by a separate lever disposed near one of the handles 30. A brake actuator, in the form of a hand brake lever 34, is provided near the right handle 30 for braking the vehicle 10, as will be explained in greater detail below. As seen in the figures, the hand brake lever 34 is provided generally forwardly of the right handle 30 so as to be actuated by multiple fingers of a user, however, it is contemplated that the hand brake lever 34 could be provided generally forwardly of the left handle 30.

A pair of driver foot pegs 36 are provided on either sides of the vehicle 10 below the first portion 20 of the straddle seat 12 for a driver to rest his feet thereon. Similarly a pair of passenger foot pegs 38 are provided on either side of the vehicle 10 below the second portion 22 of the straddle seat 12 for a passenger to rest his feet thereon. Another brake actuator, in the form of a foot brake lever 40, is provided on a right side of the vehicle 10 below the first portion 20 of the straddle seat 12 for braking the vehicle 10, as will be explained in greater detail below. As best seen in FIG. 6B, the foot brake lever 40 is preferably provided near the right driver foot peg 36 such that the driver can actuate the foot brake lever 40 while a portion of his foot remains on the right driver foot peg 36. The foot brake lever 40 also preferably pivots about an axis which is coaxial with the right driver foot peg 36 in order to facilitate the actuation of the foot brake lever 40 by the driver.

Figure 13:
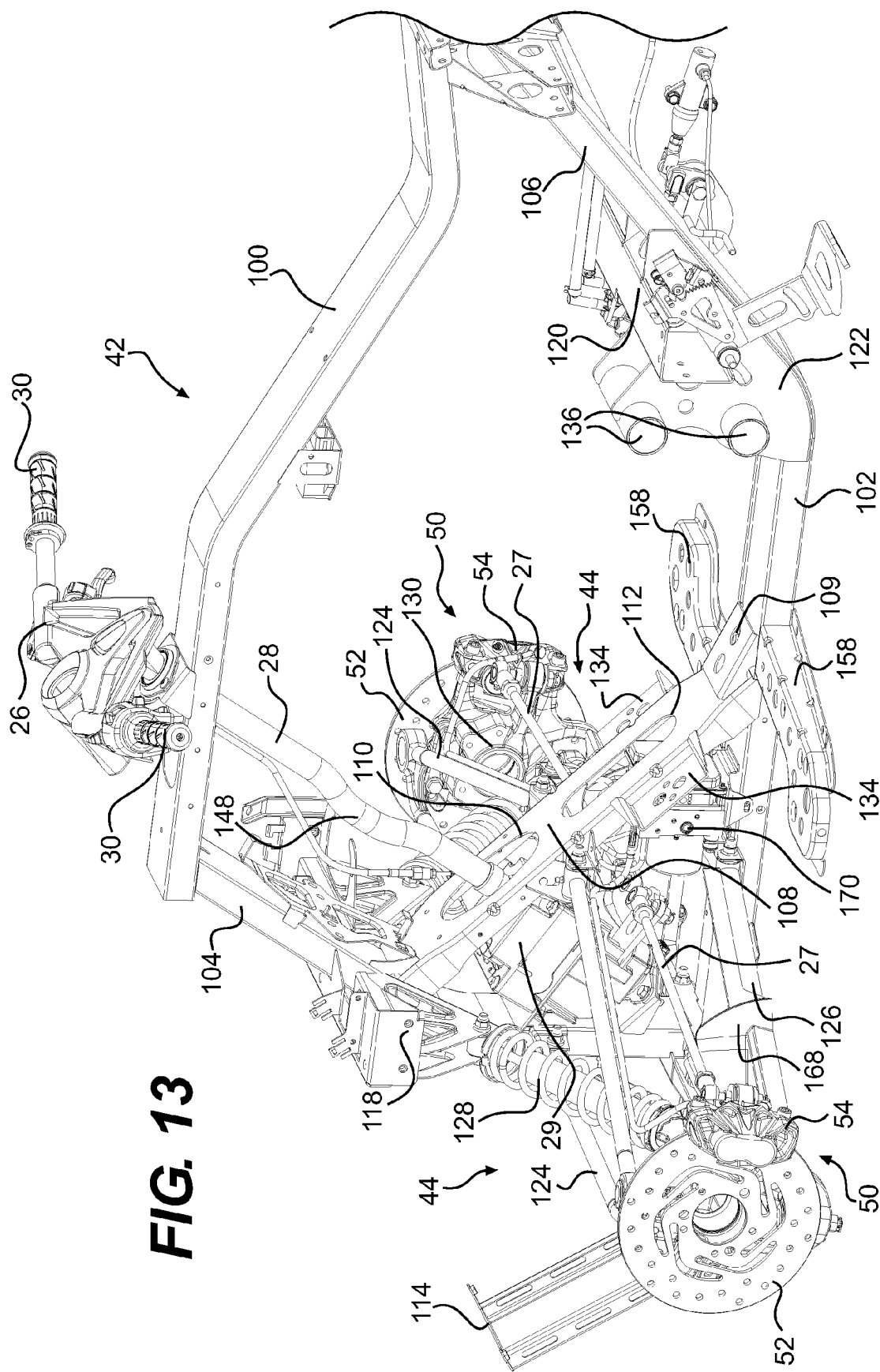
FIG. 13 is a close-up perspective view, taken from a rear, left side, of the front portion of the frame and the front suspension of the vehicle of FIG. 2.
Figure 14:
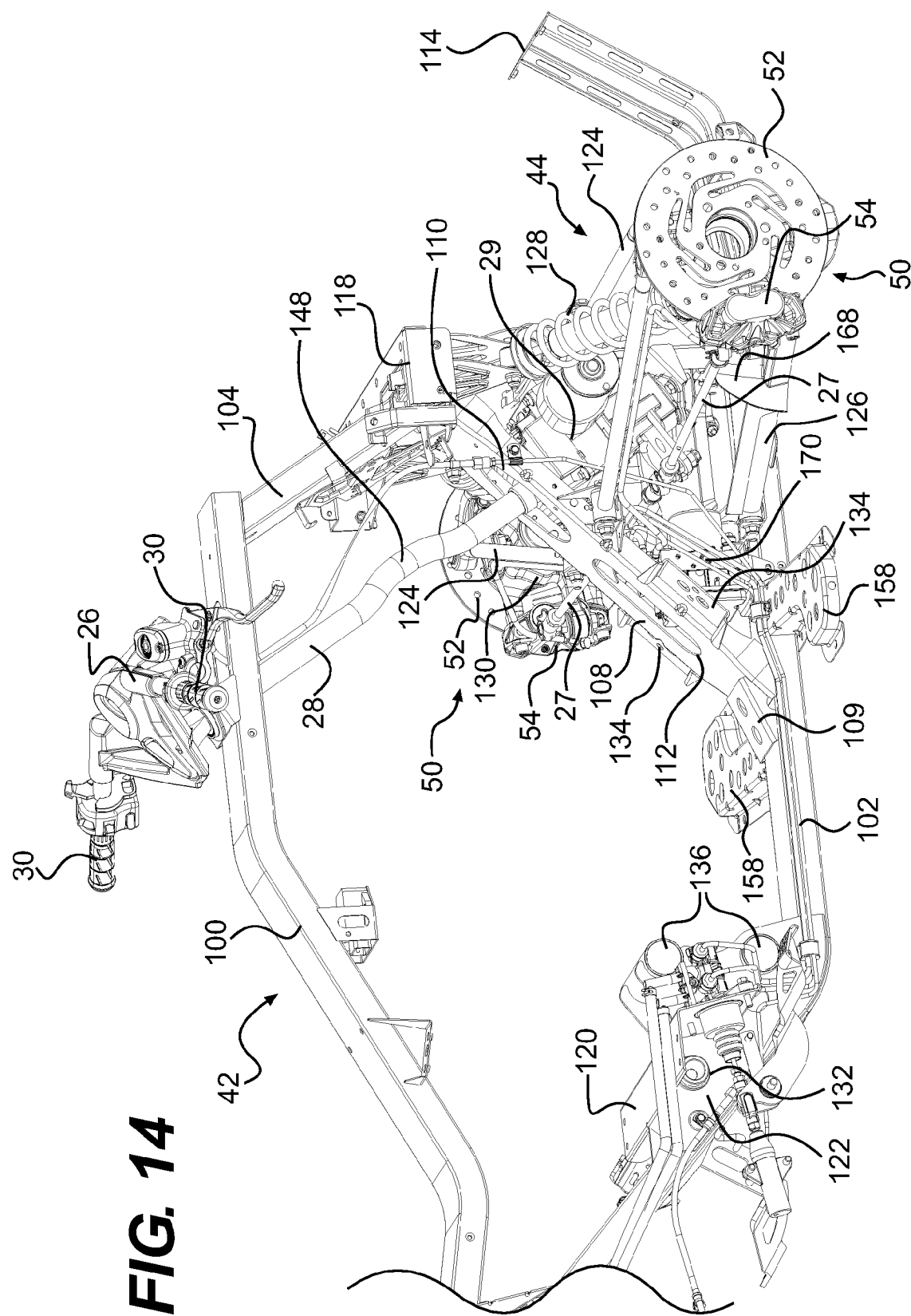
FIG. 14 is a close-up perspective view, taken from a rear, left side, of the front portion of the frame and the front suspension of the vehicle of FIG. 2.

Each of the two front wheels 14 is mounted to the frame 42 (FIG. 8) of the vehicle 10 via a front suspension 44 as will be described in greater detail below. Each of the two front wheels 14 has a tire 46 thereon which is suitable for road use. The tires 46 are preferably inflated to a pressure between 138 kPa and 345 kPa. A fairing 48 is disposed over each tire 46 to protect the driver from dirt and water which can be lifted by the tire 46 while it is rolling. Each of the two front wheels 14 is also provided with a brake 50. As best seen in FIGS. 13 and 14, the brake 50 is preferably a disc brake mounted onto a wheel hub of each wheel 14, however other types of brakes are contemplated. The brakes 50 each have a rotor 52 mounted onto the wheel hub and a stationary caliper 54 straddling the rotor 52. The brake pads (not shown) are mounted to the caliper 54 so as to be disposed between the rotor 52 and the caliper 54 on either sides of the rotor 52. By applying hydraulic pressure to a piston (not shown) inside the caliper 54 the brake pads squeeze the rotor 52 which, through friction, brakes the wheel 14.

Figure 7:
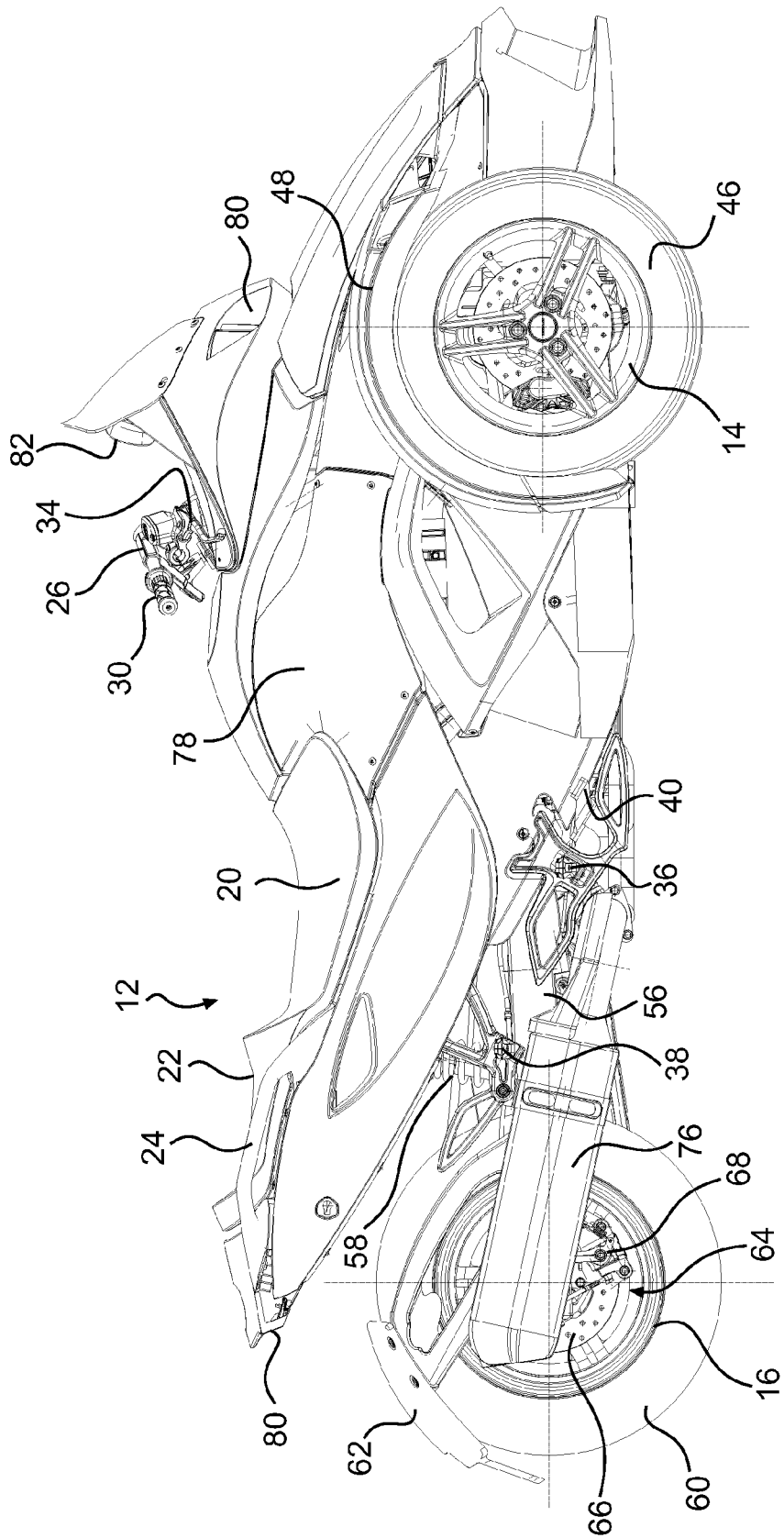
FIG. 7 is a right side elevation view of the vehicle of FIG. 2.

The rear wheel 16 is mounted to the frame 42 via a swing arm 56. The swing arm 56 preferably has two arms pivotally mounted at a front thereof to the frame 42 and between which the rear wheel 16 is rotatably mounted at the rear of the two arms. A shock absorber unit 58 is disposed between the swing arm 56 and the frame 42, as will be discussed in greater detail below. The rear wheel 16 has a tire 60 thereon which is suitable for road use. Preferably, the tire 60 is wider than the tires 46. It is contemplated that the tire 60 could have a smaller width or the same width as the tires 46. It is also contemplated that the rear wheel 16 could have two or more tires disposed next to each other thereon and still be considered a single rear wheel in the context of the present invention. The tire 60 is preferably inflated to a pressure between 138 kPa and 345 kPa. A fairing 62 is disposed over the tire 60 to protect the driver from dirt and water which can be lifted by the tire 60 while it is rolling. The rear wheel 16 is provided with a brake 64. As best seen in FIG. 7, the brake 64 is preferably a disc brake mounted to a right side of wheel 16. The brake 64 has a rotor 66, caliper 68, brake pads (not shown), and a piston (not shown) similar to those used with brakes 50. The brake 64 brakes the rear wheel 16 in the same way as the brakes 50 brake the front wheels 14. A wheel sprocket 70 is mounted to a left side of the rear wheel 16. A belt 72 is disposed about the wheel sprocket 70 and a driving sprocket 71 to transmit power from the engine 32 to the rear wheel 16. The driving sprocket 71 receives power from the engine 32 via a transmission 73. The transmission 73 is operatively connected to the crankshaft 74 (schematically illustrated in FIG. 8) of the engine 32. It is contemplated that a continuously variable transmission (CVT) could be provided between the crankshaft 74 and the driving sprocket 71.

As can also be seen in FIGS. 2 to 8, an exhaust pipe 76 extending on the right side of the vehicle 10 towards the rear thereof is attached to an exhaust port (not shown) of the engine 32 to improve engine performance and to reduce the noise level of the engine 32. A vehicle body 78 is attached to the frame 42 in order to protect the components mounted to the frame 42 and to make the vehicle 10 aesthetically pleasing. Components necessary to make vehicle 10 suitable for road use, such as lights 80 and a rear view mirror 82, are mounted to the vehicle body 78.

Figure 9:
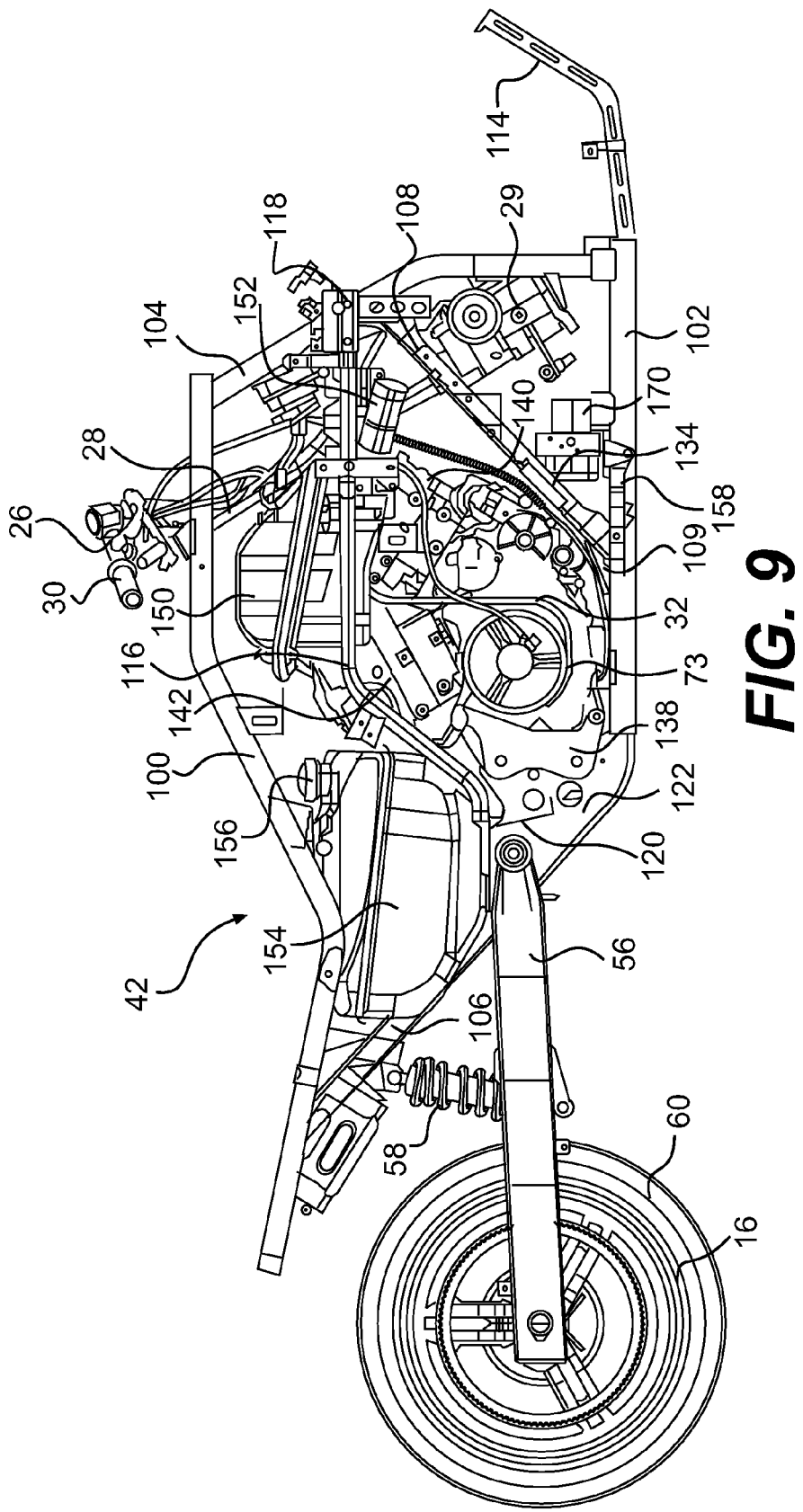
FIG. 9 is a right side elevation view of the internal components of the vehicle of FIG. 2 with some of the components removed for clarity.
Figure 10:
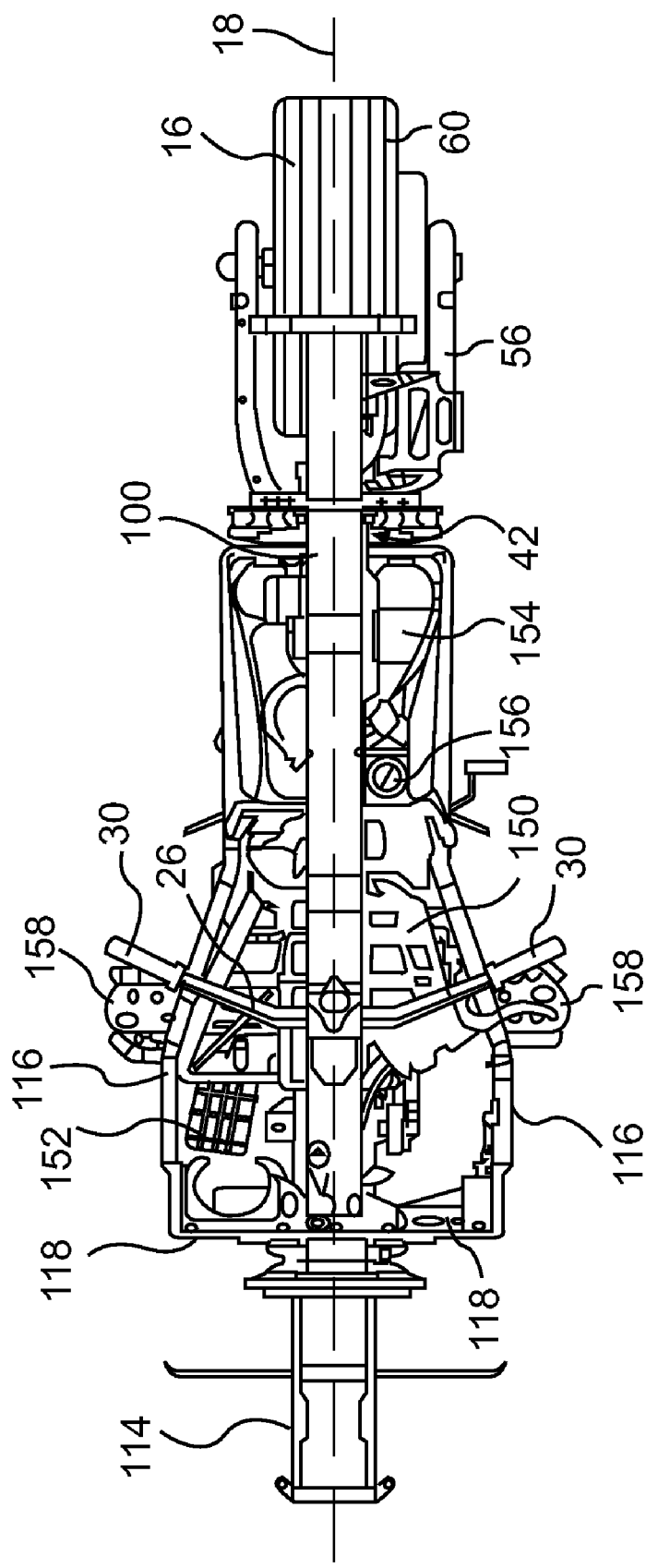
FIG. 10 is a top view of the internal components of the vehicle of FIG. 2 with some of the components removed for clarity.

Turning now to FIGS. 8 to 10, the frame 42 has an upper frame member 100 and a lower frame member 102 which are interconnected with each other, thus forming a closed perimeter with a space therein. A forward cross member 104 interconnects a forward portion of the upper frame member 100 with a forward portion of the lower frame member 102. A rearward cross member 106 interconnects a rearward portion of the upper frame member 100 with a rearward portion of the lower frame member 102. The upper frame member 100, lower frame member 102, forward cross member 104, and rearward cross member 106 are preferably made of metallic tubular beams having similarly sized rectangular cross-sections. It is contemplated that the members 100, 102, 104, 106 could have different cross-sectional dimensions, could be made of non-metallic material (composite materials for example), and could also have a different configuration (I-beams or C-channels for example).

As seen in FIGS. 8 and 9, the upper frame member 100 is preferably bent in two locations such that a forward portion thereof is located higher than a rearward portion thereof. By doing this, the forward portion of the frame 42 provides sufficient vertical space to accommodate some of the vehicle components. Also, by doing this, the straddle seat 12, which is mounted on the rearward portion of the upper frame member 100, is maintained at a height from the ground which permits a driver of the vehicle 10 to rest his feet on the ground while sitting on the straddle seat 12 when the vehicle 10 is stopped. It is contemplated that the upper frame member 100 could have a different geometry. For example, the upper frame member 100 could be straight. Although this may place the straddle seat 12 higher above the ground, a driver of the vehicle 10 does not need to place his feet on the ground when the vehicle 10 is stopped since the three-wheeled configuration of the vehicle 10 will maintain the vehicle 10 in an upright position. The lower frame member 102 and the rearward cross member 106 are preferably integrally formed as a single beam that is bent in one location. It is also contemplated that these members 102, 106 could be welded to each other. The rearward cross member 106 extends rearwardly and upwardly from the lower frame member 102 and is welded to the upper frame member 100. The upper and lower ends of the forward cross member are welded to the upper frame member 100 and the lower frame member 102 respectively. It is contemplated that the members 100, 102, 104, 106 may be joined by other means. For example, they may be joined by using brackets and fasteners. It is also contemplated that the members 100, 102, 104, 106 could be made of a single beam which could be bent to obtain a closed perimeter.

The frame 42 also has a strut 108 which extends diagonally from the forward cross member 104 to the lower frame member 102, to which it is preferably welded. A reinforcing member 109 (as best seen in FIG. 13) is provided at the connection between the strut 108 and the lower frame member 102 to reinforce the connection. By providing the strut 108, the frame 42 is reinforced which allows it to withstand the forces experienced by the frame 42 when the vehicle 10 is operated at speeds typical of road use. The strut 108 also provides additional attachment points for some of the vehicle components, as will be discussed in greater detail below. The strut 108 is preferably a C-channel, but could have different configurations. Two openings 110, 112 (FIG. 13) are provided on an upper surface of the strut 108. These openings 110, 112 reduce the weight of the strut 108. The opening 110 also allows the steering column 28 to pass therethrough.

Figure 15:
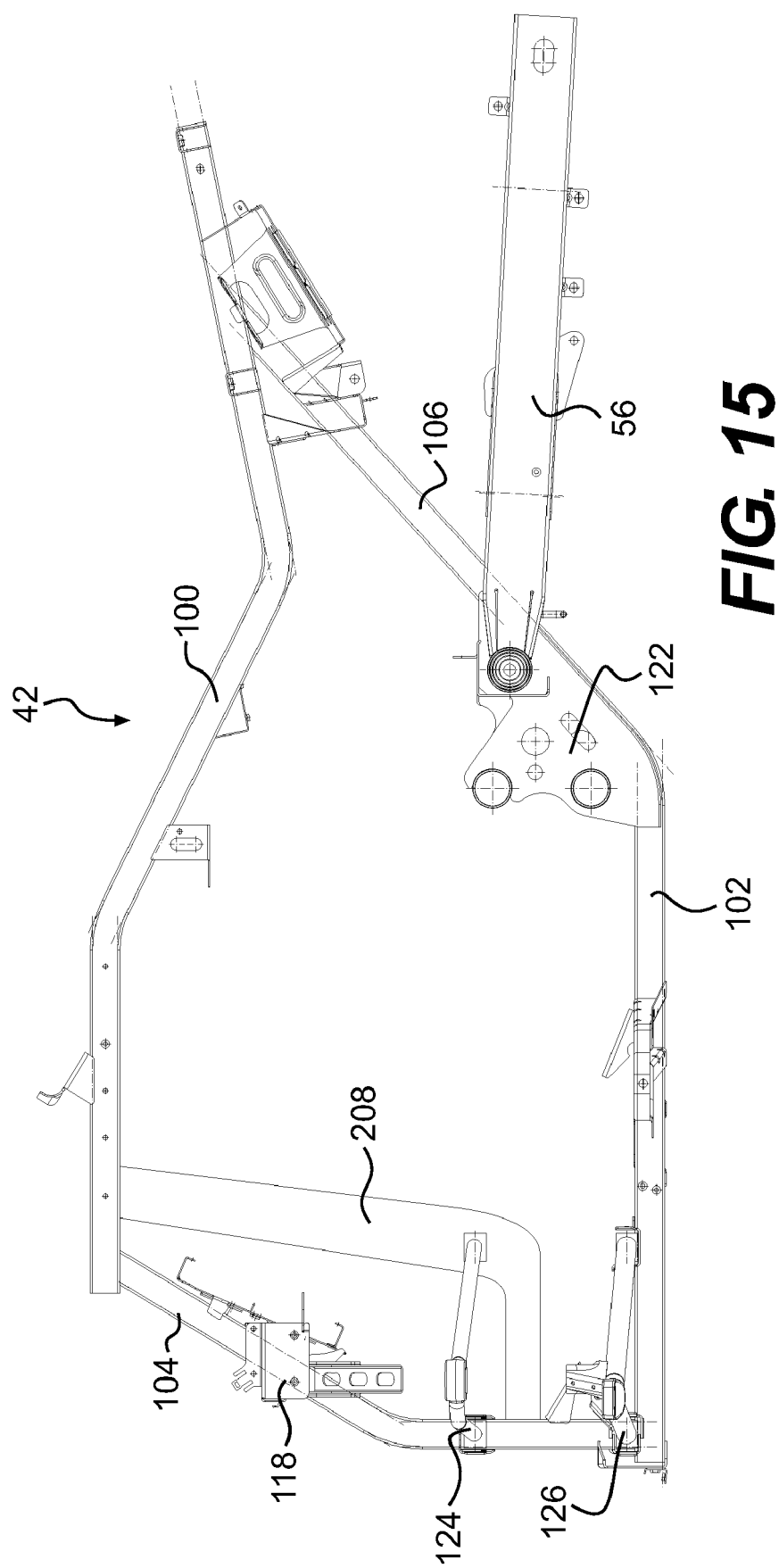
FIG. 15 is a left side elevation view of an alternative embodiment of a frame in accordance with the present invention.
Figure 16:
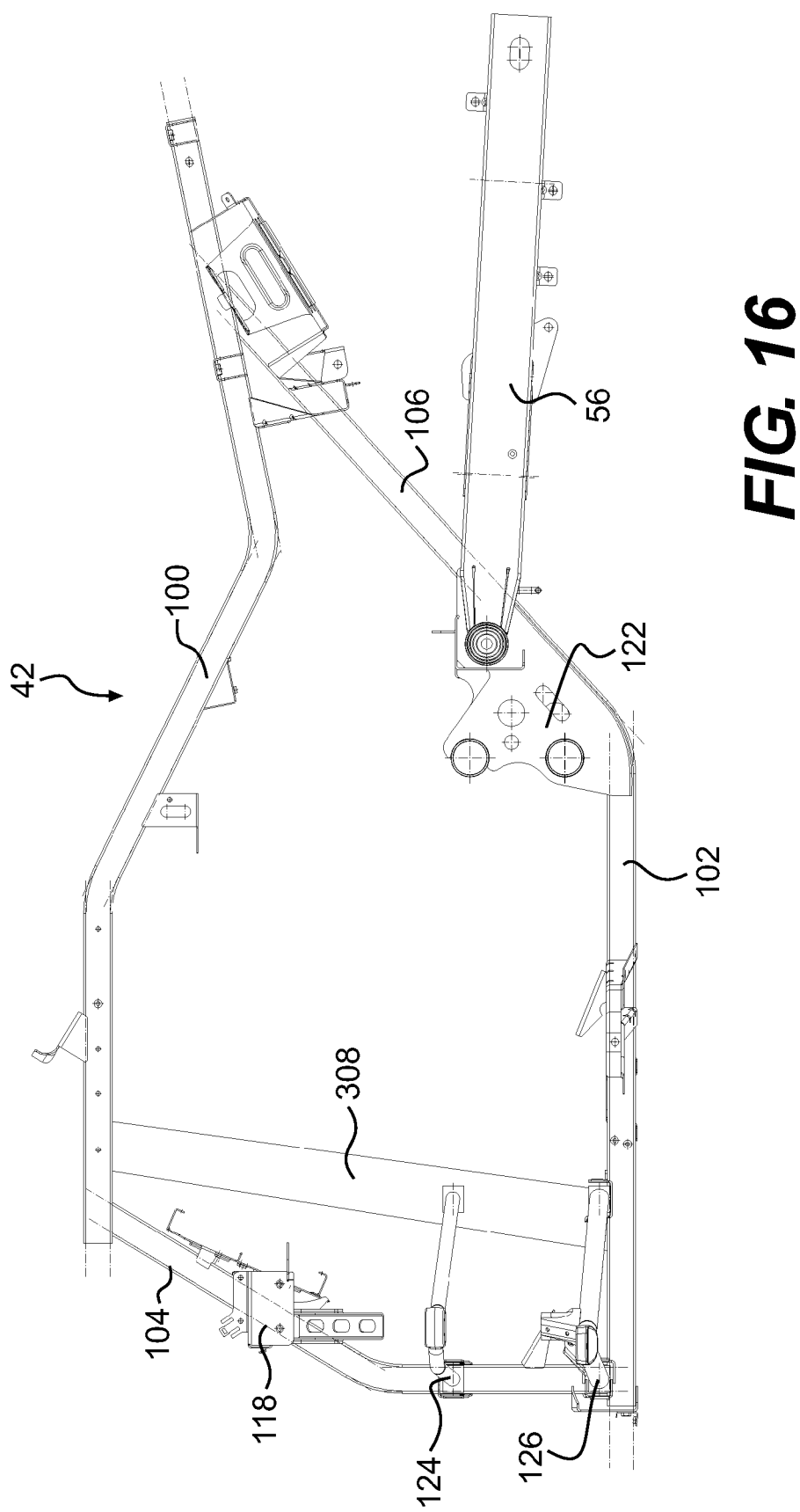
FIG. 16 is a left side elevation view of another alternative embodiment of a frame in accordance with the present invention.

FIGS. 15 and 16, in which like elements have been labeled with the same reference numerals as in the previous figures, illustrate alternative embodiments of the frame 42. In the embodiment shown in FIG. 15, a L-shaped strut 208 extends from the forward cross member 104 to the upper frame member 100 to reinforce the frame 42. In the embodiment shown in FIG. 16, a straight strut 308 extends diagonally from the upper frame member 100 to the lower frame member 102 to reinforce the frame 42. The struts 208 and 308 also provide additional attachment points for some of the vehicle components, as will be described below. Other shapes and locations of a strut for reinforcing the frame 42 are also contemplated.

As can be seen in FIG. 10, the upper frame member 100, lower frame member 102, forward cross member 104, rearward cross member 106, and the strut 108 are disposed on the longitudinal centerline 18 of the vehicle. Therefore, all of the members 100, 102, 104, 106 of the frame 42 lie in a in a common vertical plane.

A forward frame extension 114 is connected to the front portion of the lower frame member 102. The forward frame extension 114 supports the front of the vehicle body 78 and a front storage bin (not shown). A tubular member 116 is disposed on each side of the frame 42 to provide attachment points for the vehicle body 78. Each tubular member 116 is attached at a front end thereof to a connecting member 118, which is itself connected to the forward cross member 104. The back end of each tubular member 116 is connected to an end portion of a fuel tank mounting bracket 120, which is itself connected to the lower frame member 102 and the rearward cross member 106 via bracket 122.

As previously mentioned, each of the two front wheels 14 is mounted to the frame 42 of the vehicle 10 via a front suspension 44. Each of the front suspensions 44 is a double A-arm suspension, also known as a double wishbone suspension. Each of the front suspensions 44 has an upper A-arm 124, a lower A-arm 126, and a shock absorber unit 128. The shock absorber unit 128 preferably consists of a hydraulic shock absorber with a coil spring disposed around the shock absorber. One end of the upper A-arm 124 and of the lower A-arm 126 is connected to a corresponding upper and lower end of a wheel spindle 130 of the wheel 14. The other end of each A-arm 124, 126 is connected to suspension attachment points on the frame 42 as described below. The shock absorber unit 128 is connected at one end to the lower A-arm 126 and to the forward cross member 104 via the connecting member 118. Each A-arm 124, 126 has a front arm and a rear arm. As best seen in FIGS. 13 and 14, both arms of the lower A-arms 126 are connected to the lower frame member 102. The front arms of the upper A-arms 124 are connected to the forward frame cross member 104. The rear arms of the upper A-arms 124 are connected to the strut 108. In the embodiments shown in FIGS. 15 and 16, the rear arms of the upper A-arms are connected to the struts 208 (FIG. 15) and 308 (FIG. 16), as the case may be. This type of front suspension 44 provides a good control on the roll or sway of the vehicle 10.

Each wheel 14 has a pivot axis defined by a generally vertical line passing through the ends of the upper and lower A-arms 124, 126 to which the wheel spindle 130 is connected. The pivot axis of each wheel 14 is preferably located rearwardly of the front of the lower frame member 102.

As previously mentioned, the rear wheel 16 is mounted to the frame 42 via a swing arm 56. More specifically, the swing arm 56 is pivotally mounted to a bushing 132 (FIG. 14) in bracket 122. The length of the swing arm 56 is preferably selected such that at least a portion of the rear wheel 16 is disposed below the rear portion of the upper frame member 100. The shock absorber unit 58 is preferably mounted to the swing arm 56 at one end and to the rearward cross member 106 at the other, so as to be disposed along the longitudinal centerline 18 of the vehicle 10. The shock absorber unit 58 preferably consists of a hydraulic shock absorber with a coil spring disposed around the shock absorber.

As can be seen in FIGS. 8 to 12, the engine 32 and many of its components are disposed inside the space formed by the closed perimeter of the frame 42. The engine 32 is mounted at the front thereof to the strut 108 via strut brackets 134 (FIGS. 13, 14). The engine 32 is also mounted at the rear thereof to two bushings 136 (FIGS. 13, 14) on bracket 122 (which, as previously mentioned, is mounted on the rearward cross member 106) via engine mount bracket 138. An elastomeric material, such as rubber, is preferably disposed between the engine 32 and its attachment points 134, 136 so as to reduce the transmission of vibrations from the engine 32 to the frame 42. In this mounting position, the crankshaft 74 of the engine 32 is disposed horizontally and perpendicularly to the longitudinal center line 18 of the vehicle 10. Furthermore, the engine 32 is preferably mounted to the frame 42 so that it does not sit on the lower frame member 102 also to reduce the transmission of vibrations from the engine 32 to the frame 42. The engine 32 is a V-type engine having a front cylinder 140 and a rear cylinder 142. For this reason, the engine 32 is also know as a V-twin engine. The front cylinder 140 defines a front cylinder axis 144 passing through a center thereof. The rear cylinder 142, defines a rear cylinder axis 146 passing through a center thereof.

The steering column 28 passes through the upper frame member 100 forwardly of the straddle seat 12 and extends inside the space formed by the closed perimeter of the frame 42. It is contemplated that the steering column 28 could pass to one side of the upper frame member 100 instead of passing through it. The steering column 28 is disposed rearwardly of the forward cross member 104 and in front of the engine 32. As best seen in FIGS. 13 and 14, the steering column 28 has a bent portion 148 so as to not interfere with the front cylinder 140. The steering column 28 passes through the strut 108. The lower end of the steering column 28 is connected to the power steering unit 29 below the strut 108. The power steering unit 29 is connected to the forward cross member 104. Alternatively, the lower end of the steering column 28 could be pivotally connected directly to the forward cross member 104 in cases where a power steering unit 29 is not being used.

An air box 150 is provided in fluid communication with an inlet port (not shown) of each cylinder 140, 142 to enhance engine performance, prevent water and dirt from entering the engine 32, and reduce the noise coming out of the inlet ports. The air box 150 has an inlet in the form of two tubes 152 having an open end pointing towards a front of the vehicle 10. As seen in FIG. 8, a portion of the air box 150 is disposed above the engine 32 forwardly of the rear cylinder axis 146. Preferably, a portion of the air box 150 is disposed between the two cylinder axes 144, 146. The air box 150 is mounted to and supported by the throttle body (not shown) which is disposed between the cylinders 140, 142. The air box 150 is preferably attached to the throttle body with one or more threaded fasteners. A rubber support (not shown) is disposed between the engine 32 and the air box 150 to provide additional support to the air box 150. During operation of the engine 32, the air flows in the tubes 152, enters the air box 150, passes inside the throttle body which is used to regulate the flow of air, and enters the cylinders 140, 142 to be combusted therein.

Figure 6:
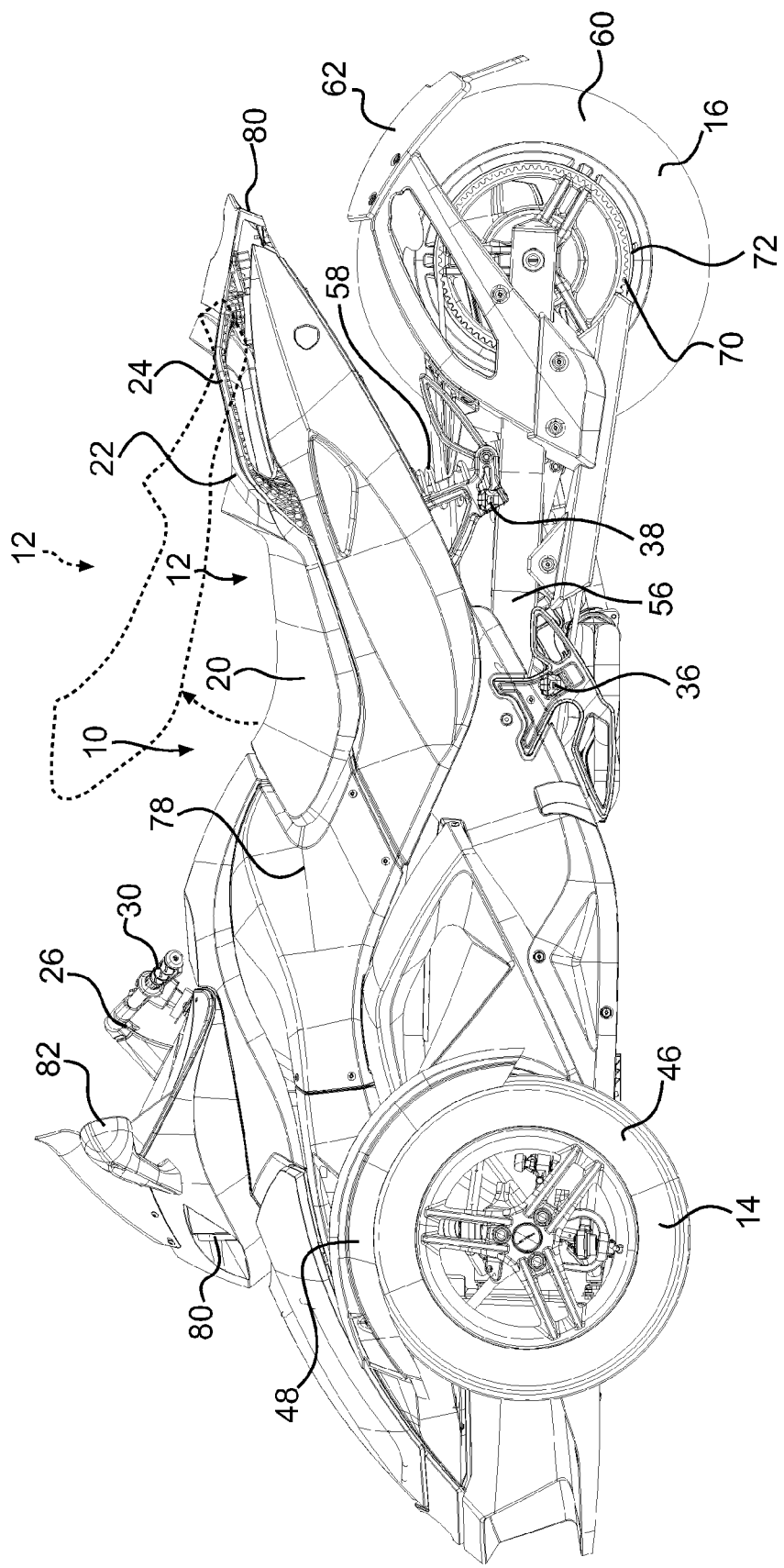
FIG. 6 is a left side elevation view of the vehicle of FIG. 2.

The fuel tank 154 of the vehicle 10 is mounted inside the space formed by the closed perimeter of the frame 42 rearwardly of the engine 32 and the air box 150. The fuel tank 154 is attached to the upper frame member 100 and to the fuel tank mounting bracket 120. The fuel tank is positioned below the upper frame member 100, below the straddle seat 12, such that the fuel tank filler cap 156 can be accessed under the straddle seat 12 to permit refilling of the fuel tank 154. As is schematically illustrated in FIG. 6, the straddle seat 12 is preferably hinged to the vehicle 10 so as to pivot to a position providing access to the fuel tank filler cap 156. Alternatively, the straddle seat 12 could be removable.

Figure 11:
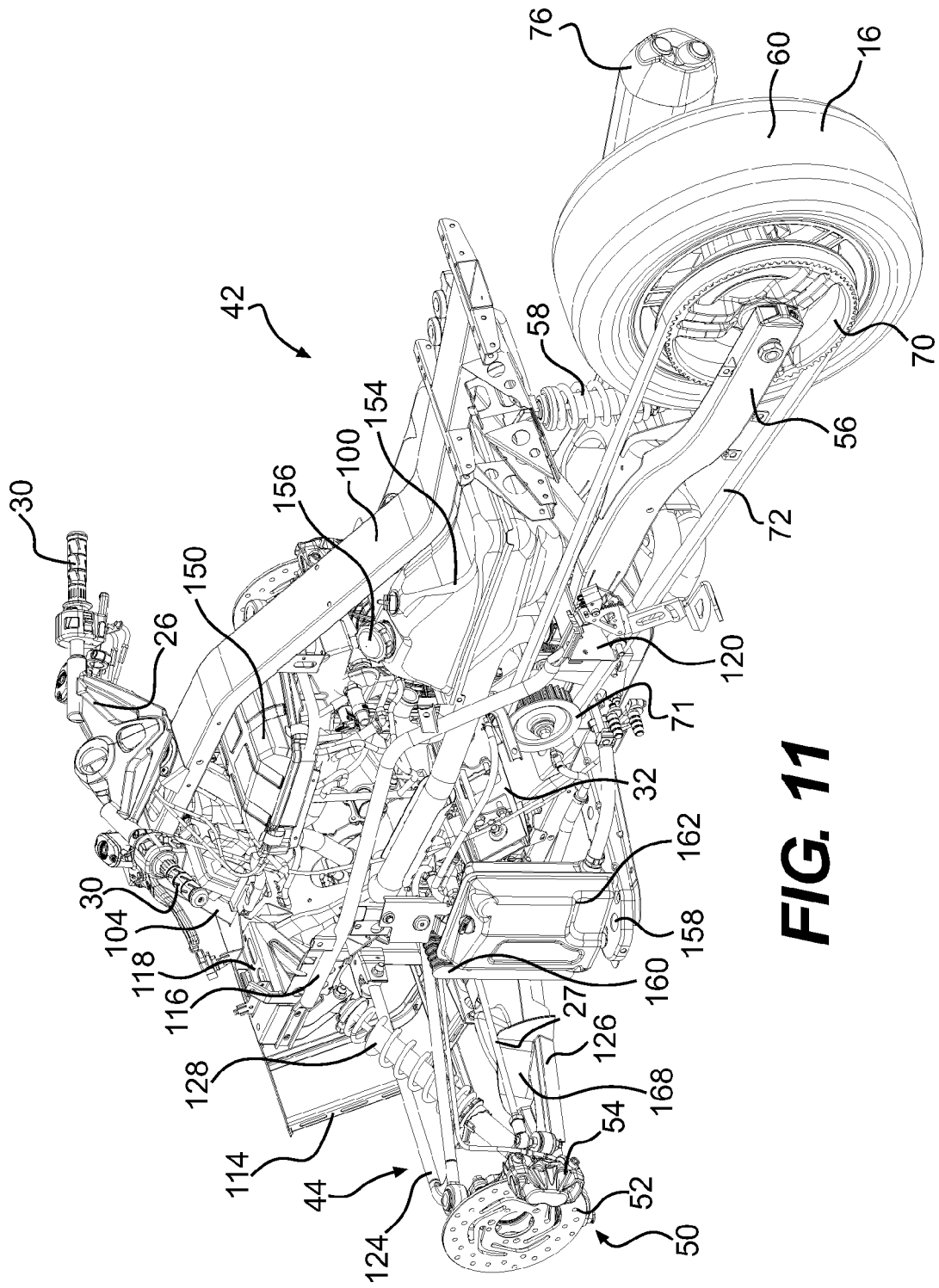
FIG. 11 is a perspective view, taken from a rear, left side, of the internal components of the vehicle of FIG. 2 with some of the components removed for clarity.
Figure 12:
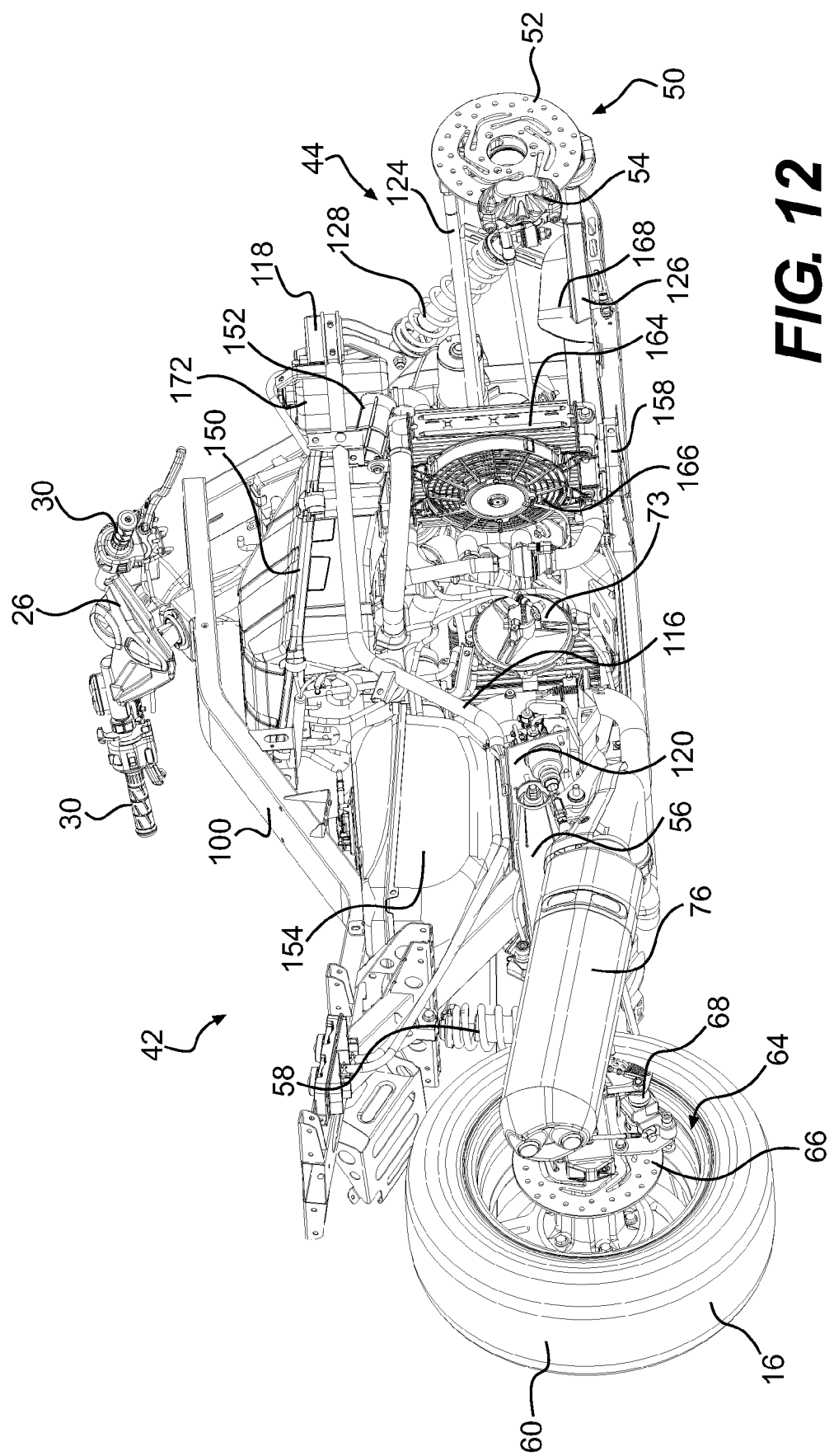
FIG. 12 is a perspective view, taken from a rear, right side, of the internal components of the vehicle of FIG. 2 with some of the components removed for clarity.

A side bracket 158 is provided on each side of the lower frame member 102 to mount additional components of the vehicle 10. As seen in FIG. 11, an oil cooler 160 and an oil tank 162 are mounted to the left side bracket 158. As seen in FIG. 12, an engine radiator 164, having a fan 166 mounted thereon, is mounted to the right side bracket 158. Locating the radiator 164 and the oil cooler 160 on either side of the frame 42 places them in the airflow created by the vehicle 10 when it is moving, thus enhancing the cooling provided by these components. To further enhance the cooling, a plate 168 is preferably provided on each lower A-arm 126 to direct additional air towards the radiator 164 and the oil cooler 160.

Other vehicle components are also mounted to the frame 42. An electronic brake control unit 170 is mounted to the lower frame member 102. The engine coolant reservoir 172 (FIG. 12) is mounted to the forward cross member 104 via the right connecting member 118. An electronic control unit (ECU), battery, sensors, (all not shown) and other components necessary to the operation of the vehicle 10 are also mounted to the frame 42.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A wheeled vehicle comprising:
a frame comprising:
an upper frame member;
a lower frame member;
a forward cross member interconnecting a forward portion of the upper frame member with a forward portion of the lower frame member;
a rearward cross member interconnecting a rearward portion of the upper frame member with a rearward portion of the lower frame member,
the upper frame member, lower frame member, forward cross member, and rearward cross member defining a closed perimeter with a space therein; and
a strut extending from one of the upper frame member, the lower frame member, the forward cross member, and the rearward cross member, to another one of the upper frame member, the lower frame member, the forward cross member, and the rearward cross member,
the upper frame member, lower frame member, forward cross member, rearward cross member, and strut being disposed along a longitudinal centerline of the vehicle;
a straddle seat mounted on the upper frame member;
a front left wheel and a front right wheel, each of the front wheels being mounted to the frame via a front suspension, each of the suspensions being connected to the frame at plurality of positions, one of the plurality of positions being on the strut;
a single rear wheel disposed along the longitudinal centerline of the vehicle;

a swing arm mounting the single rear wheel to the frame;
a rear suspension operatively disposed between the swing arm and the frame;
a steering column operatively connected to the front wheels for steering the front wheels, the steering column extending inside the space rearwardly of the forward cross member;
handlebars connected to an upper end of the steering column above the upper frame member; and
an engine disposed in the space and operatively connected to the rear wheel to power the rear wheel.

2. The vehicle of claim 1, wherein the strut extends diagonally from the forward cross member to the lower frame member.

3. The vehicle of claim 2, wherein a portion of the engine is mounted to the strut.

4. The vehicle of claim 3, wherein another portion of the engine is mounted to the rearward cross member via a bracket.

5. The vehicle of claim 1, wherein each of the front suspensions comprises an upper A-arm and a lower A-arm, each A-arm having a front arm and a rear arm; and
wherein the rear arm of each upper A-arm is connected to the strut.

6. The vehicle of claim 5, wherein the front arm of each upper A-arm is connected to the forward cross member, and the front and rear arms of each lower A-arm are connected to the lower frame member.

7. The vehicle of claim 5, wherein each of the front suspensions further comprises a shock absorber extending from the lower A-arm to the forward cross member.

8. The vehicle of claim 1, wherein the steering column passes through the upper frame member forwardly of the straddle seat.

9. The vehicle of claim 8, wherein the steering column passes through the strut.

10. The vehicle of claim 9, wherein a lower end of the steering column is pivotally connected to the forward cross-member.

11. The vehicle of claim 1, wherein the rear suspension is connected to the rearward cross member.

12. The vehicle of claim 1, wherein the rear suspension includes a shock absorber disposed along a longitudinal centerline of the vehicle.

13. The vehicle of claim 1, wherein at least a portion of the single rear wheel extends under the upper frame member.

14. The vehicle of claim 1, wherein each front wheel pivots about a pivot axis being positioned longitudinally rearwardly of a forward most portion of the frame.

15. A frame for a wheeled vehicle comprising:
an upper frame member;
a lower frame member;
a forward cross member interconnecting a forward portion of the upper frame member with a forward portion of the lower frame member;
a rearward cross member interconnecting a rearward portion of the upper frame member with a rearward portion of the lower frame member,
the upper frame member, lower frame member, forward cross member, and rearward cross member defining a closed perimeter with a space therein;
a strut extending from one of the upper frame member, the lower frame member, the forward cross member, and the rearward cross member, to another one of the upper frame member, the lower frame member, the forward cross member, and the rearward cross member; and
a plurality of suspension attachment points disposed on the frame, at least one of the suspension attachment points being disposed on the strut,
the upper frame member, lower frame member, forward cross member, rearward cross member, and strut being disposed along a common plane.

16. The frame of claim 15, wherein the strut extends diagonally from the forward cross member to the lower frame member.

17. The frame of claim 15, wherein the rearward cross member extends rearwardly and upwardly from the lower frame member.

18. The frame of claim 17, wherein the lower frame member and the rearward cross member are integrally formed.

19. A wheeled vehicle comprising:
a frame comprising:
an upper frame member;
a lower frame member;
a forward cross member interconnecting a forward portion of the upper frame member with a forward portion of the lower frame member;
a rearward cross member interconnecting a rearward portion of the upper frame member with a rearward portion of the lower frame member,
the upper frame member, lower frame member, forward cross member, and rearward cross member defining a closed perimeter with a space therein; and
a strut extending from one of the upper frame member, the lower frame member, the forward cross member, and the rearward cross member, to another one of the upper frame member, the lower frame member, the forward cross member, and the rearward cross member,
the upper frame member, lower frame member, forward cross member, rearward cross member, and strut being disposed along a longitudinal centerline of the vehicle;
a straddle seat mounted on the upper frame member;
a front left wheel and a front right wheel, each of the front wheels being mounted to the frame via a front suspension;
a single rear wheel disposed along the longitudinal centerline of the vehicle;
a swing arm mounting the single rear wheel to the frame;
a rear suspension operatively disposed between the swing arm and the frame;
a steering column operatively connected to the front wheels for steering the front wheels, the steering column extending inside the space rearwardly of the forward cross member, the steering column passing through the strut;
handlebars connected to an upper end of the steering column above the upper frame member; and
an engine disposed in the space and operatively connected to the rear wheel to power the rear wheel.

20. The vehicle of claim 19, wherein the steering column passes through the upper frame member forwardly of the straddle seat.

21. The vehicle of claim 19, wherein a lower end of the steering column is pivotally connected to the forward cross-member.

22. The vehicle of claim 19, wherein the strut extends diagonally from the forward cross member to the lower frame member.

23. The vehicle of claim 22, wherein a portion of the engine is mounted to the strut.

24. The vehicle of claim 19, wherein the rear suspension is connected to the rearward cross member.

25. The vehicle of claim 19, wherein at least a portion of the single rear wheel extends under the upper frame member.

* * * * *

UNITED STATES PATENT AND TRADEMARK OFFICE
CERTIFICATE OF CORRECTION

| | | |
|---|---|---|
| PATENT NO. | : 7,543,672 B2 | Page 1 of 1 |
| APPLICATION NO. | : 11/381036 | |
| DATED | : June 9, 2009 | |
| INVENTOR(S) | : Bruce Codere and Brian Mastine | |

It is certified that error appears in the above-identified patent and that said Letters Patent is hereby corrected as shown below:

Column 10

Line 63, replace "each of the suspensions" with -- each of the front suspensions --

Signed and Sealed this

Twenty-first Day of July, 2009

JOHN DOLL
*Acting Director of the United States Patent and Trademark Office*